(12) United States Patent
Brodkowitz

(10) Patent No.: US 11,757,974 B2
(45) Date of Patent: Sep. 12, 2023

(54) SYSTEM AND METHOD FOR ONLINE LITIGATION PLATFORM

(71) Applicant: LIGHTNING DEP INC., Seattle, WA (US)

(72) Inventor: Alisa R. Brodkowitz, Seattle, WA (US)

(73) Assignee: LIGHTNING DEP INC., Seattle, WA (US)

( * ) Notice: Subject to any disclaimer, the term of this patent is extended or adjusted under 35 U.S.C. 154(b) by 0 days.

(21) Appl. No.: 17/374,572

(22) Filed: Jul. 13, 2021

(65) Prior Publication Data

US 2022/0014582 A1 Jan. 13, 2022

Related U.S. Application Data

(60) Provisional application No. 63/051,178, filed on Jul. 13, 2020.

(51) Int. Cl.
| | |
|---|---|
| *G06F 15/16* | (2006.01) |
| *H04L 67/06* | (2022.01) |
| *G06F 40/103* | (2020.01) |
| *H04N 7/15* | (2006.01) |
| *H04L 65/403* | (2022.01) |

(52) U.S. Cl.
CPC ............ *H04L 67/06* (2013.01); *G06F 40/103* (2020.01); *H04L 65/403* (2013.01); *H04N 7/15* (2013.01)

(58) Field of Classification Search
None
See application file for complete search history.

(56) References Cited

U.S. PATENT DOCUMENTS

| | | | | |
|---|---|---|---|---|
| 2003/0217264 | A1* | 11/2003 | Martin | H04L 9/3247 713/156 |
| 2006/0218029 | A1* | 9/2006 | Chin | G06Q 10/109 705/80 |
| 2010/0257457 | A1* | 10/2010 | De Goes | H04L 65/1093 707/E17.007 |
| 2012/0036130 | A1* | 2/2012 | Light | G06F 40/30 707/769 |
| 2015/0378995 | A1* | 12/2015 | Brown | H04L 65/403 707/608 |
| 2021/0065320 | A1* | 3/2021 | Bleiweiss | G06F 40/289 |

\* cited by examiner

*Primary Examiner* — Atta Khan
(74) *Attorney, Agent, or Firm* — SHOOK, HARDY & BACON L.L.P.

(57) ABSTRACT

In various examples, a computerized method for document-sharing conferencing is described. The method may include steps such as acquiring and saving an electronic document. The method may include receiving an active event indication and instructing the electronic document to be displayed on one or more displays during an active event. The method may further include receiving an active layer for the electronic document and instructing the active layer to be displayed on the electronic document during the active event. The method may also include saving the active layer with the electronic document.

17 Claims, 10 Drawing Sheets

FIGURE 4B

All Cases > Lochner v. York > Mary Johnson

✎ EDIT DEPOSITION

Mary Johnson
Lochner v. York 1905cv1153

4:31 p.m. PacificTime (Daylight Savings) Friday, Jul. 2 2021
Taking Lawyer: Jane Smith Join Deposition Action Items
5/8 ▬▬▬▬▬

WITNESS
Mary Johnson   Send Invite

OBSERVERS
+ Add an observer

Stenographer
ebrown@abcsteno.com   >Contact Information   Charge
invite pending

MY DOCUMENTS (1)   EXHIBITS (0)   MY OUTLINES (1)   FILE MANAGER

Upload file into Mary Johnson folder:

Drag 'n' drop some files here, or click to select files

☐ Open for screen sharing   ☐ Create link   ☐ Create folder   Actions ˅   ☐ Options ˅

↑ 🗁 Case / Depositions / Mary Johnson

🔍 Search    5 items

| 0 | | | |
|---|---|---|---|
| Outline | doc1.pdf | doc2.pdf | image1.jpg | doc3.pdf |

Jane Smith

☐ Dashboard
☐ Cases
☐ Depositions

My Account - Lawyer
Help Center
Payment Center
Terms of Service

SYSTEM AND METHOD FOR ONLINE LITIGATION PLATFORM

BACKGROUND

Increasing technology has made fully or partially remote meetings and other proceedings more common. Video conferencing systems allow for fully or partially remote interactions, discussions, and the like. The video conferencing system provides a video feed of two or more participants. While video conferencing systems have existed, these systems lack a full integration with electronic documents that may be used and/or referenced as part of the proceeding. These systems typically only integrate documents through screen sharing and/or file sending, which is insufficient for numerous proceedings.

In an example legal field, various proceedings may be held remotely and/or utilize digital documents. Example proceedings may include a court hearing, a trial, a deposition, and an arbitration. These proceedings have largely relied upon paper documents, but this is disadvantageous for several reasons. First, paper documents are not easily presented to a finder of fact (such as a judge or jury). Second, paper documents are difficult to certify and verify, as numerous potentially different versions of the document may be present. Third, a large portion of documents are created and stored electronically, forcing numerous printings and/or physical copies to be created. This is intensive in time, cost, and other resources. Fourth, paper copies present few or no customization options to a presenter of the document. Fifth, paper copies may become lost or destroyed, which is counter to retention needs of the proceeding.

SUMMARY

Embodiments of the present disclosure relate to a document-sharing conference system that overcomes at least some of the above-discussed problems with existing video conferencing systems. Systems and methods are disclosed herein that provide advanced document management, customization, sharing, and retention. For example, and in contrast to conventional systems, such as those described above, systems and methods of the present disclosure provide electronic documents that are easily presentable to a finder of fact or other participant, are certified and/or verified, stored electronically, customizable, and retainable.

A first example embodiment of the invention is directed to a computerized method for document-sharing conferencing as performed by a server. The method may include steps such as acquiring and saving an electronic document. The method may include receiving an active event indication and instructing the electronic document to be displayed on one or more displays during an active event. The method may further include receiving an active layer for the electronic document and instructing the active layer to be displayed on the electronic document during the active event. The method may also include saving the active layer with the electronic document.

A second example embodiment of the invention is directed to a computerized method for document-sharing conferencing as performed by a user device. The method may include receiving a user copy of an electronic document from a server. The method may include displaying the first user copy on a display and receiving, via an input, a customization of the electronic document from the user. The method may further include displaying a video conference along with the electronic document and the customization. The method may further include sending the customization to a server such that the server may distribute the customization to one or more participants. A local copy may be stored along with the customization.

A third example embodiment of the invention is directed to a system for document-sharing conferencing. The system may include a server and at least one user device. The server may include a non-transitory computer readable storage medium having a computer program stored thereon which, when executed by a server processor, instructs the server processor to perform the steps discussed above. The at least one user device may include a non-transitory computer readable storage medium having a computer program stored thereon which, when executed by a user device processor, instruct the user device processor to perform the steps discussed above.

BRIEF DESCRIPTION OF THE DRAWINGS

The present systems and methods for document-sharing conferencing are described in detail below with reference to the attached drawing figures, wherein:

FIGS. 4A-D illustrate example graphical user interfaces, suitable for use in implementing some embodiments of the present disclosure;

DETAILED DESCRIPTION

Systems and methods are disclosed related to document retention, encryption, customization, and/or presentation for video conferencing and live presentation. Although primarily described herein with respect to video conference implementations, this is not intended to be limiting, and the systems and methods of the present disclosure may be implemented in any implementation for electronic documents. For non-limiting examples, the systems and methods described herein may be implemented for general document retention, collaborative document creation and editing, virtual learning applications, social media content sharing applications, video sharing applications, and/or other application types where electronic documents may be utilized.

Example Document-Sharing Conference System

Figure 1:
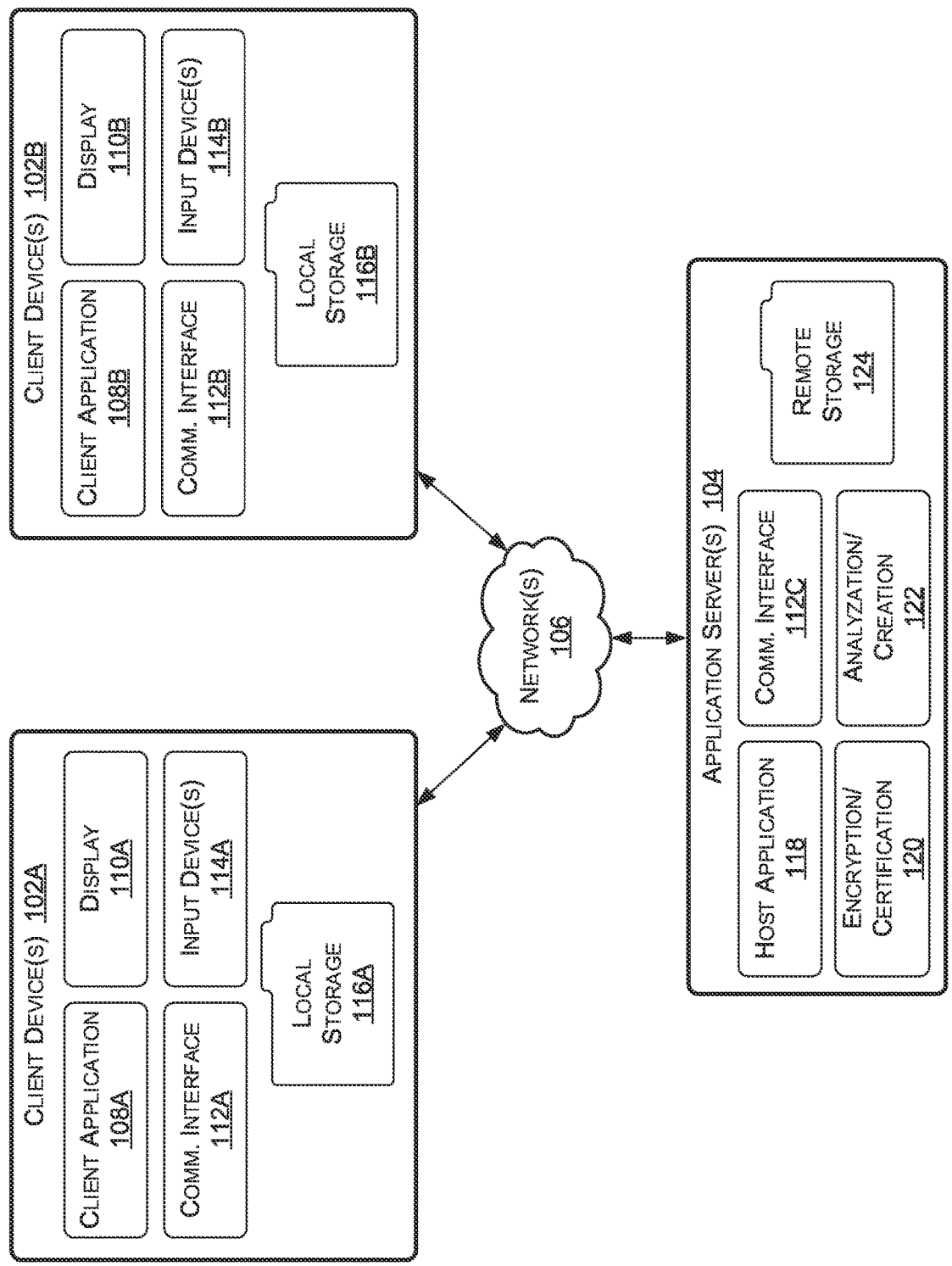
FIG. 1 is an example document-sharing conference system, suitable for use in implementing some embodiments of the present disclosure.

With reference to FIG. 1, FIG. 1 is an example document-sharing conference system 100 (alternatively referred to herein as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the system 100 may include similar components, features, and/or functionality to those of example content streaming system 500 of FIG. 5, example computing device 600 of FIG. 6, and/or example data center 700 of FIG. 7.

The document-sharing conference system 100 may include, among other things, client devices 102A and 102B (referred to collectively herein as "client devices 102") and an application server 104. Although the client devices 102A and 102B are illustrated in FIG. 1, this is not intended to be limiting. In any example, there may be any number (e.g., one or more) of client devices 102. Components of the document-sharing conference system 100 may communicate over network(s) 106. The network(s) may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, Ultra-Wideband (UWB), etc.), a low-power wide-area network (LPWAN) (e.g., LoRaWAN, Sigfox, etc.), a global navigation satellite system (GNSS) network (e.g., the Global Positioning System (GPS)), and/or another network type. In any example, each of the components of the document-sharing conference system 100 may communicate with one or more of the other components via one or more of the network(s) 106.

The client devices 102 may include a smart phone, a laptop computer, a tablet computer, a desktop computer, a wearable device, a game console, a virtual/augmented/mixed reality system (e.g., a headset, a computer, a game console, remote(s), controller(s), and/or other components), a streaming device, a smart-home device that may include an intelligent personal assistant, another type of device capable of supporting video conferencing or other applications types (e.g., gameplay, video chat, customer service chat, etc.), and/or a combination thereof.

The client devices 102A/102B may include a client application 108A/108B, a display 110A/110B, a communication interface 112A/112B, an input device(s) 114A/114B, and/or local storage 116A/116B. Although only a few components and/or features of the client devices 102 are illustrated in FIG. 1, this is not intended to be limiting. For example, the client devices 102 may include additional or alternative components, such as those described below with respect to FIGS. 6 and/or 7.

The client application 108A and 108B (referred to collectively herein as "client applications 108") may include a mobile application, a computer application, a console application, and/or another type of application. The client applications 108 may include instructions that, when executed by a processor(s), cause the processor(s) to, without limitation, receive input data representative of user inputs to the one or more input device(s) 114, transmit the input data to the application server(s) 104, retrieve application data from memory or local storage 116, receive the application data using the communication interfaces 112 from the application server(s) 104, and cause display of the application on the display 110. For example, the client application 108 may operate as a facilitator for enabling streaming of a video conferencing session associated with the client application on the client devices 102. The client application 108 may also include instructions that, when executed by a processor(s), cause the processor(s) to transmit data to, and receive data from, the application server(s) 104. For example, the client application 108A may transmit to the application server(s) 104 real-time feedback regarding document manipulations and/or customizations performed on the client application 108A, and receive from the application servers(s) 104 real-time feedback regarding document manipulations and/or customizations performed on the client application 108B. In other examples, the client application 108A may transmit to the application server(s) 104 session data (e.g., attenuation data, a list of users, time of day, meeting topic, and/or other contextual data) from any number of application sessions. In such examples, the host application 118 may generate (e.g., by a machine learning model, a deep neural network (DNN), or another algorithm type) typical user behavior predictions for a given context.

The displays 110A and 110B (referred to collectively herein as "displays 110") may include any type of display capable of displaying the application (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, the displays 110 may include more than one display (e.g., a dual-monitor display for a computer). In some examples, the display is a touch-screen display, such as a touch-screen of a smart phone, tablet computer, laptop computer, or the like, where the touch-screen is at least one of the input device(s) 114 of the client devices 102.

The input device(s) 114A and 114B (referred to collectively herein as "input device(s) 114") may include any type of devices that are capable of providing user inputs to the application. The input device(s) may include a keyboard, a mouse, a microphone(s), a touch-screen display, a controller(s), a remote(s), a headset (e.g., sensors of a virtual/augmented/mixed reality headset), and/or other types of input devices.

The communication interface 112A, 112B, 112C (referred to collectively herein as "communication interfaces 112") may include one or more components and features for communicating across one or more networks, such as the network(s) 106. The communication interfaces 112 may be configured to communicate via any number of network(s) 106, described herein. For example, to communicate in the document-sharing conference system 100 of FIG. 1, the client devices 102 may use an Ethernet or Wi-Fi connection through a router to access the Internet in order to communicate with the application server(s) 104 and/or with other client devices 102. The communication interfaces 112 may also send documents, portions of documents, layers for documents, metadata related to documents, and other information related to one or more documents to be shared or otherwise utilized during an active event.

The local storage 116A and 116B (referred to collectively herein as "local storage 116") may include any of a variety of computer-readable media. The computer-readable media may be any available media that can be accessed by the client devices 102. The computer-readable media may include both volatile and nonvolatile media, and removable and non-removable media. By way of example, and not limitation, the computer-readable media may comprise computer-storage media and communication media. The local storage 116 may include additional or alternative components, such as those described herein with respect to the memory 604 of FIG. 6. In accordance with some embodiments of the present disclosure, portions of the client application 108 may be stored in the local storage 116. In some embodiments, application session data—such as a list of documents, attenuation data, a list of users (which may include a role for one or more users), a time of day, a topic for the active event, and/or other contextual data—may be stored in the local storage 116.

The application server(s) 104 may include host application 118 and communication interface 112C. The host application 118 may correspond to the client applications 108. However, rather than performing document-sharing conference operations locally on client devices 102, the host application 118 may perform the document-sharing conference operations described herein on the application servers 104 and communicate the one or more documents with one or more layers to the client devices 102. As described above, the communications interface 112C may include one or more components and features for communicating across one or more networks. Although only a few components and/or features of the application server(s) 104 are illustrated in FIG. 1, this is not intended to be limiting. For example, the application server(s) 104 may include additional or alternative components, such as those described below with respect to the example content streaming system 500 of FIG. 5, the example computing device 600 of FIG. 6, and/or the example data center 700 of FIG. 7.

The application server(s) 104 may include an encryption/certification application 120. The encryption/certification application 120 may encrypt one or more documents that are received from the one or more client devices 102 using any of various encryption algorithms and methods. The encryption may ensure that the document is not changed after being received. The encryption/certification application 120 may verify a source or other indication of the genuineness of the document, such as a state court system, a federal court system (using a system known as Public Access to Court Electronic Records ("PACER"), a governmental agency, a business, an individual, or the like. The certification application 122 may label the document and/or assign metadata to the document indicative of the certification. The document, which may be encrypted and/or certified, may then be stored in a remote storage 124. The document (e.g., a version or copy thereof) may be retrieved from the remote storage 124 by the host application 118, sent to the one or more client devices 102 via the network 106, etc.

Figure 4A:

The application server(s) 104 may include an analyzation/creation application 122 that analyzes one or more documents and creates one or more resources related to those documents for use by one or more users. Examples of the created resources may be an outline, instructions, a list of questions, background information, or another document. The resource may be used before the active event (for preparation) and/or during the active event (to support the user during the event). The analyzation/creation application 122 may perform an optical character recognition (OCR) on the document to be able to read and search the document. The analyzation/creation application 122 may utilize a machine learning algorithm or other artificial intelligence to at least partially generate or complete a set of questions related to the document for the user. As an example, the user may input a type of case as described above, type of deposition, type of witness, and other information about the proceeding (such as shown in FIG. 4A). The system may then draw from one or more documents (such as an original complaint that was filed and is in the list of documents) and/or from other outside resources (such as case law, transcripts of similar cases or proceedings, a list of example questions, etc.) to analyze the submitted documents. The system may produce a list of key information for the document, a list of background, a set of foundational questions (which may be specific to a jurisdiction, court, or other entity), a summary of the document, or other information.

Figure 2:
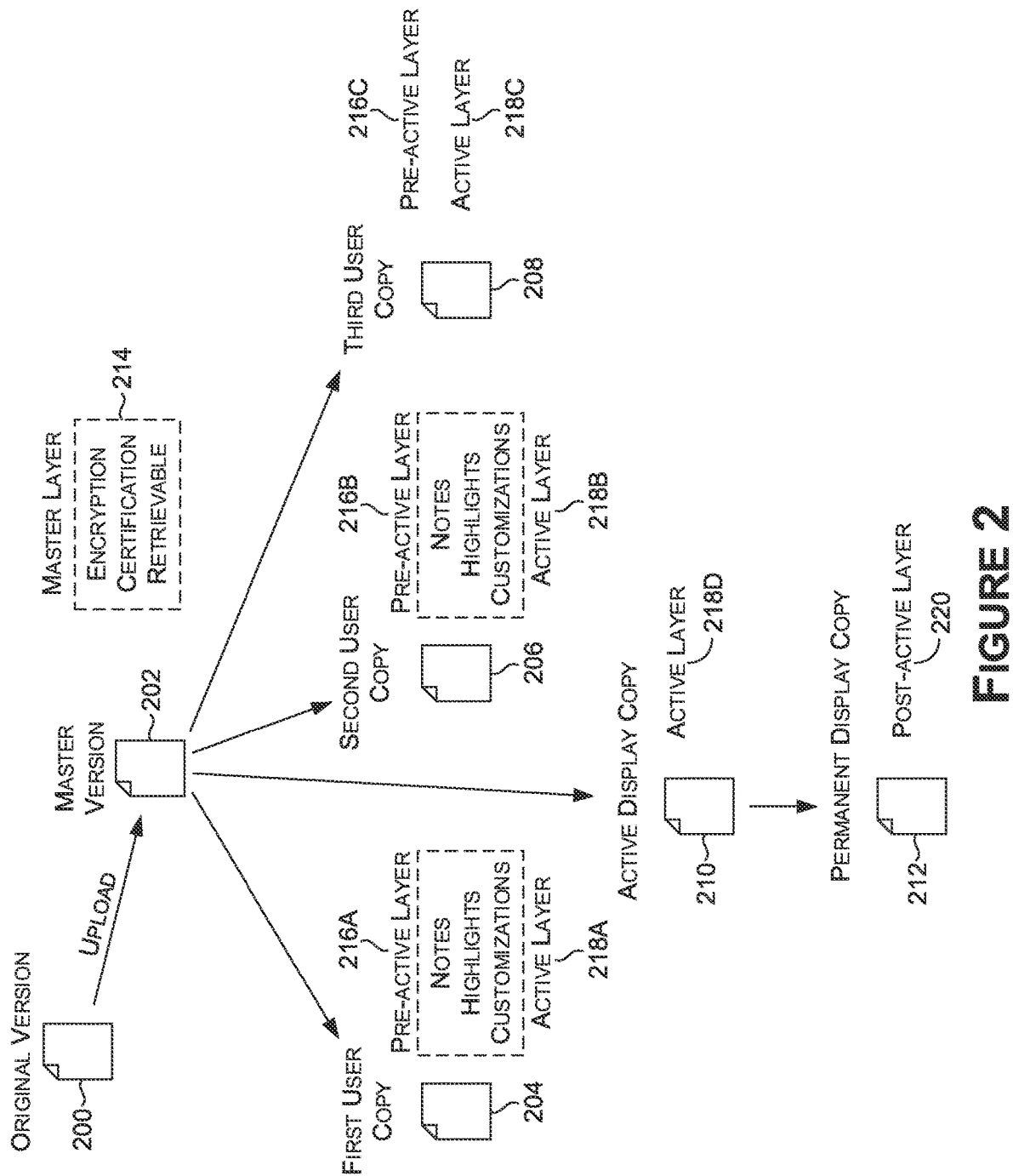
FIG. 2 illustrate example documents and accompanying layers that may be implemented in some embodiments of the present disclosure.

FIG. 2 shows various versions and/or copies of the electronic document that may be received, utilized, saved, encrypted, decrypted, retained, customized, layered, displayed, manipulated, and/or have other functions performed thereon. It should be appreciated that the versions and/or copies discussed herein are only examples to aid understanding of the reader. Various embodiments of the invention may use any combination of versions and/or copies of the electronic document(s). As used herein, "document" may refer to any set of data, including metadata about that set of data. The "document" may be a representation of a traditional physical document, a presentation, a spreadsheet, a record, or other collection of data.

An original version 200 may be received from a source computing device. The original version may be an electronically created document, a scanned version of a physical document, or other electronic file. The original version 200 may be in the form received from the source computing device, along with the original received metadata. A master version 202 may be created and/or designated based at least in part on the original version 200. The master version may include a new set of master metadata (which may be based at least in part on the original received metadata).

One or more user copies may be created from the master version 202, such as a first user copy 204, a second user copy 206, and/or a third user copy 208. User copies may be requested by and/or sent to the user device prior to an active event. For example, attorneys may access copies of the document that will be used at a proceeding before the proceeding begins such that the user or users may perform any of various tasks. User copies may additionally or alternatively be sent during an active event, such as a virtual court hearing. The user copies for before the hearing may be the same or distinct from the user copies of the active event.

An active display copy 210 may be shown during an active event, such as a court hearing, deposition, arbitration, or trial. The active display copy 210 may be shown across multiple user devices. The active display 210 may have various annotations or customizations added thereto from one or more users, such as highlights. These various annotations or customizations may be saved with the electronic document as a permanent display copy 212. The permanent display copy 212 keeps a record of the annotations and/or other annotations that were made during the active event. As such, a permanent record of the document as shown and/or modified during the event may be retained. In some instances more than one permanent record copy of the document may be shown and retained. As an example, a first witness may markup the active copy with a first active layer that will be retained. A second witness may be shown the active copy without any layer and create their own second active layer that will also be independently retained. The permanent display copy 212 with the one or more active layers may be encrypted by the encryption application 120.

Layers may be added to one or more versions and/or copies of the electronic document. Layers provide additional information or present the existing information in a certain way. A set of master layers 214 may include watermarks, evidence stamps, an evidence number, seals, signature, a document number, a page number, or other designation of information that may be added to the master version of the document. Typically, these master layers 214 may be added during the certification and/or encryption of the master version. The certification and/or encryption may take place during or before the active event. This may depend on when the documents are uploaded and/or other rules (such as when the document is admitted into evidence). A set of pre-active layers 216A-C may be added by the user devices before the active event. These may include notes, questions, talking points, highlights, cross-references, and the like. The user may add the pre-active layer during preparation for the active event, so as to assist the user in accessing and/or displaying information during the active event. A set of active layers 218A-D may be created and or added during the active event. The set of active layers 218A-D may be added to any of various screens of the various user devices and/or copies of the electronic documents. For example, a user may take notes during a deposition, which information may then be saved as a layer. The notes may be displayed to that user, and to other authorized users, during the deposition. Similarly, various aspects of the document may be highlighted, emphasized, enlarged, or otherwise customized on the active copy of the document. This active layer may be displayed to all participants. A set of post-active layers 220 may be created that may be permanently saved with the document. The set of post-active layers 220 may include the one or more active layers that were shown to all participants, as a record of the document as displayed during the active event. The post-active layers 220 may additionally or alternatively be added after the active event.

Other manipulations of the electronic document may also be possible in various embodiments of the present disclosure. As a first example, the document may be signed by one or more users during the active event, such as during a negotiation as an active event. As a second example, the document may be modified or translated during the active event.

Figure 3:
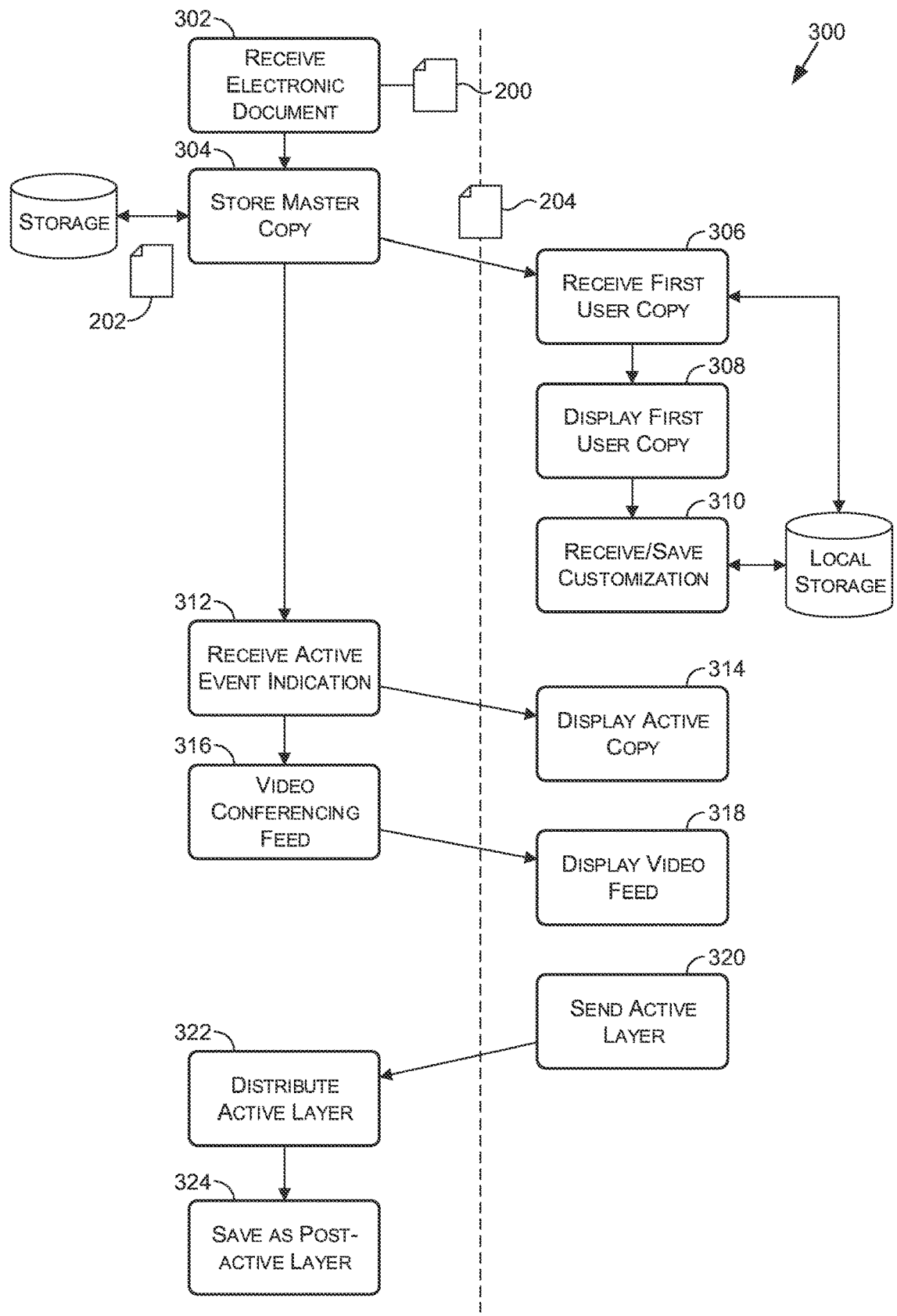
FIG. 3 is a flow diagram showing a method of document-sharing conferencing, suitable for use in implementing some embodiments of the present disclosure.

Now referring to FIG. 3, each block of method 300, described herein, comprises a computing process that may be performed using any combination of hardware, firmware, and/or software. For instance, various functions may be carried out by a processor executing instructions stored in memory. The method 300 may also be embodied as computer-usable instructions stored on computer storage media. The method 300 may be provided by a standalone application, a service or hosted service (standalone or in combination with another hosted service), or a plug-in to another product, to name a few. In addition, method 300 is described, by way of example, with respect to the system of FIG. 1. However, this method may additionally or alternatively be executed by any one system, or any combination of systems, including, but not limited to, those described herein.

FIG. 3 is a flow diagram showing a method 300 for document-sharing conferencing, suitable for use in implementing some embodiments of the present disclosure. In the example of FIG. 3, steps performed by a server (such as application server 104) are shown on a left side of the figure, and steps performed by a user device (such as client devices 102) are shown on a right side of the figure. The method 300, at Step 302, includes receiving an electronic document as an original version 200. The original version 200 may be sent from a source computing device, such as one of the user devices. The user device may send the original version 200 before the beginning of the active event, such that the original version 200 may be fully uploaded and ready at the beginning of the active event. In some instances, another source computing device may send the original version 200, such as an original creator or custodian of the electronic document.

The method 300, at Step 304, includes storing a master copy 202 of the electronic document. The step of storing the master copy 202 may include encrypting the master copy 202 such that the master copy 202 cannot be changed or altered (either accidentally or intentionally). The step of storing the master copy 202 may also include certifying the original version 200, such as by authenticating the original version 200 directly or indirectly.

The method 300, at Step 306, includes a first user device receiving a first user copy 204. The user may access or request the first user copy before, during, and/or after the active event (such as the deposition, mediation, or other hearing). This step may include storing the first user copy 204 in local storage. In other embodiments, the first user copy 204 may only be accessible while the user device is connected to the server, such that there is no local storage permitted.

The method 300, at Step 308, includes displaying the first user copy 204 on the first user device. Displaying the first user copy 204 may allow the user to review the contents, take notes, customize the first user copy 204, and perform other functions. The method 300, at Step 310, includes receiving and saving a customization. The customization may be a pre-active layer 216 or an active layer 218. The pre-active layer 216 and/or the active layer 218 may be shown overlaying or otherwise altering the display of the first user copy 204.

The method 300, at Step 312, includes receiving an active event indication, such as an indication that the active event is about to begin. The active event may be any type of event, such as in which the electronic document may be displayed to two or more people. The two or more people may be remote from each other (e.g., a video conference in which the electronic document is displayed to two or more participants) or local to each other (e.g., in a in-person courtroom hearing with a screen to show the electronic document). The method 300, at Step 314, includes displaying an active copy 210 of the electronic document. The active copy 210 may be shown alongside the video conference, such that users may see the electronic document with the one or more layers thereon, while also seeing one or more other participants. The method 300, at Step 316, includes instructing a video conference feed. The method 300, at Step 318, includes displaying the video conference feed along with the active display copy.

The method 300, at Step 320, includes sending an active layer 218 to the server. The active layer 218 may be sent by one or more user devices. As an example, the user may select one of the pre-active layers 216 saved before the active event to display as an active layer 218 to all participants. The active layer 218 may highlight a certain portion of the document, or provide some other customization. The method 300, at Step 322, includes distributing the active layer to one or more additional user devices. This allows all participants to see the new active layer 218 during the active event. The method 300, at Step 324, includes saving a post-active layer. The active layer 218 or layers that were displayed during the active event may be saved such that a record exists of what active layers were shown. This may allow for recreation of the active layers, such as in the case of a subsequent active event, such as another hearing, an appeal from the prior hearing, general record keeping, or the like.

Turning to FIGS. 4A-D, example graphical user interfaces that may be displayed in one or more embodiments of the present disclosure. The example graphical user interfaces may show one or more aspects of the present disclosure and are intended to convey these concepts to the reader. Other aspects of the invention may not be shown or may be displayed in another user interface.

FIG. 4A shows an example case creation interface. In the example legal field of use, the case creation interface may allow a user, such as an attorney, paralegal, assistant, judge, court clerk, mediator, arbitrator, litigant, witness, or other person to create a case record. A menu panel (shown at left) may include a dashboard, cases, depositions, and/or other resources to which the user has access. The menu may also provide access to account information, a help center, a payment center, a terms of service statement, and/or other resources to which the user may have access. For a particular case, the user may be presented with one or more fields to enter information related to that case. This information may be associated with the documents directly or indirectly. For example, the information from the fields may be added or associated with the documents as metadata. Example fields include a case name, a case number, due dates, case type, court name, party names, attorney names, and other information.

FIG. 4B shows an example document management interface. This example document management interface is related to a deposition of a single witness within a case, such as the one created in FIG. 4A. The example document management interface may include information about the active event associated, such as a deposition of a certain witness. The document management interface may include information about the witness, a stenographer, and/or other observers. The document management interface may further include a listing of personal documents, exhibits, outlines, and other files. The user may be able to add documents, which may be treated as original versions 200 of the electronic document. The user may select any of various documents to display and customize with one or more layers. The user may also create new documents for notes, outlines, questions, or the like.

Figure 4C:
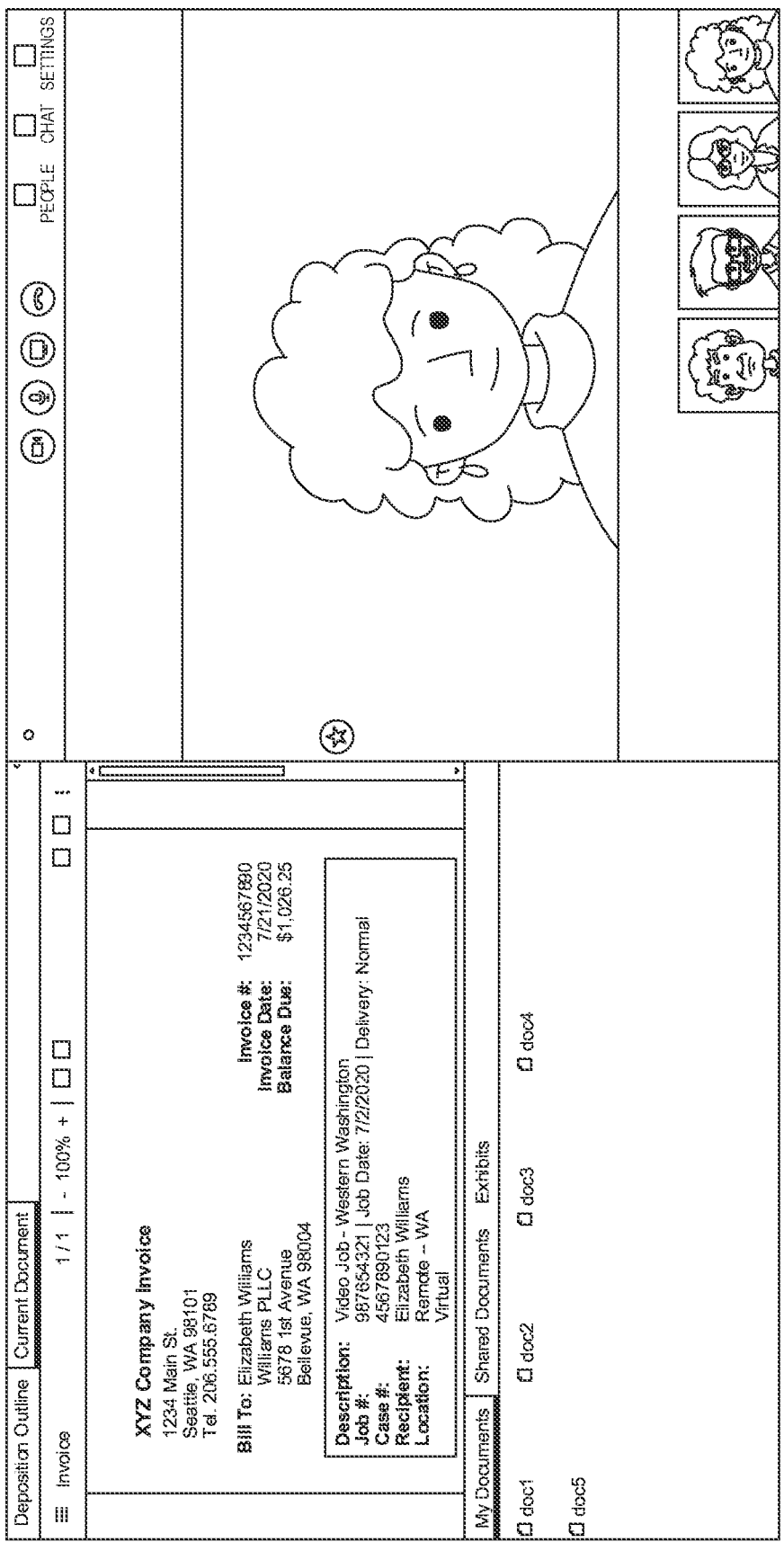

FIG. 4C shows an example document sharing video conference interface. The document sharing conference interface may be shown during the active event, such as the deposition, arbitration, hearing, or other event. The video conference interface may show one or more video feeds and/or audio feeds. Additional participants or observers may be watching with neither a video feed nor an audio feed. An active copy 210 of the electronic document may be shown to one or more participants or observers. One user, such as an attorney, may ask questions related to the active copy 210 of another user, such as a witness. The witness may refer to the document in providing answers. The attorney, or other presenter, may emphasize or show certain portions of the active copy 210. Some users may be able to independently scroll through the document, open and close other documents, and perform other tasks related to documents while the active copy 210 is being shown.

Figure 4D:
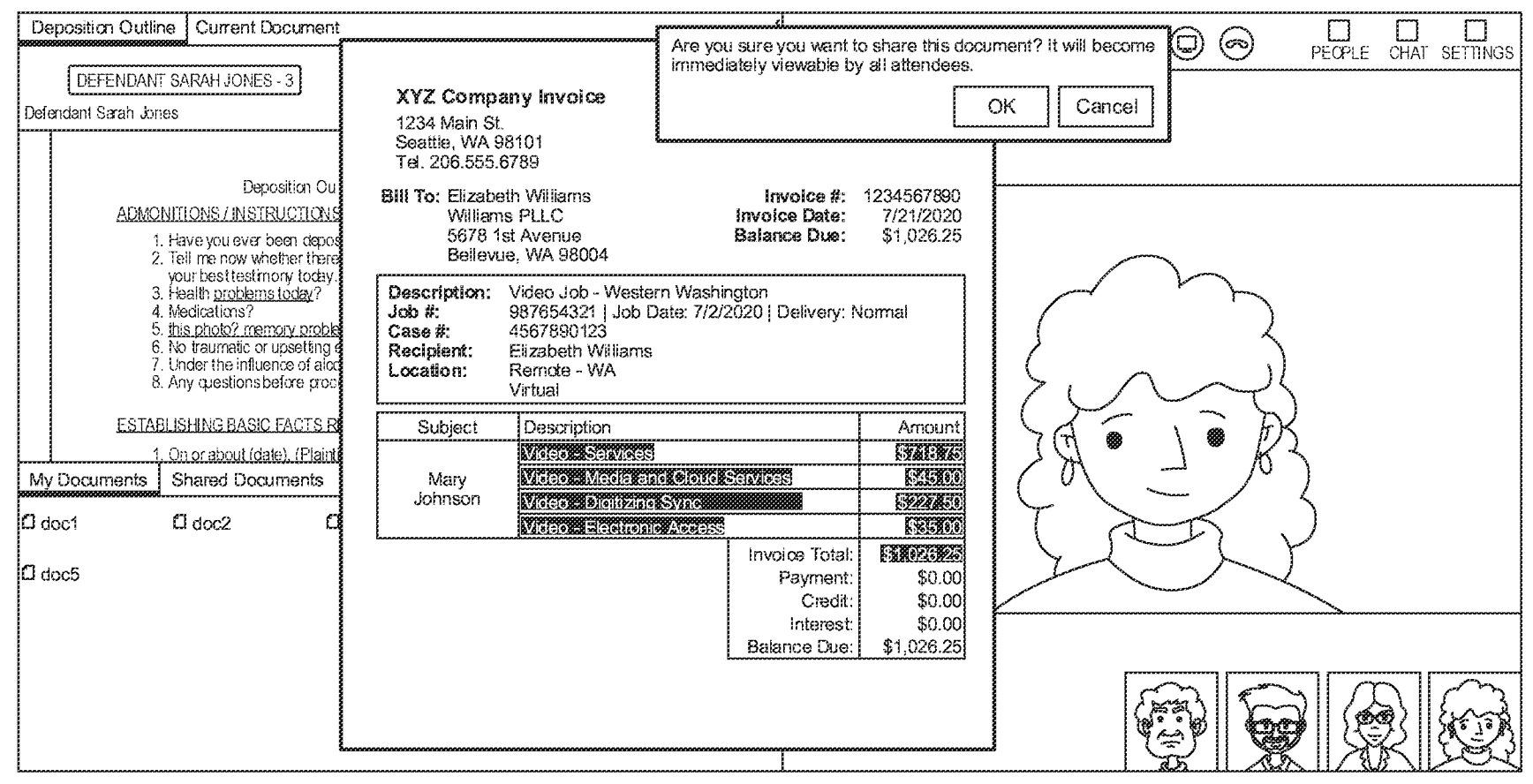

FIG. 4D shows an example document sharing video conference interface with an active layer on an active copy 210 as well as a user-specific document. The active layer, such as the highlighting shown, may emphasize or increase visibility of a section of the active copy 210.

The user may additionally be able to view a user-specific document. The user-specific document may be an outline, instructions, a list of questions, background information, or another document. The user may reference the user-specific document during the active event. The user interface may also present a warning, as shown, to let a user known that a certain action may move another document to be the active document. In embodiments of the present disclosure, the user-specific document may have been at least partially created and/or edited by a machine learning algorithm or other artificial intelligence, such as the analyzation/creation application 122 discussed above. The analyzation/creation application 122 may produce and/or supplement a list of key information for the document, a list of background information, a list of foundational questions for the document, a list of key information from the document, a list of quotes from one or more external documents (such as a complaint) that relate to the current document and/or witness, or provide other information that may be useful to the attorney or other user.

The user may be presented with other information during the active event. As a first example, a user (such as a defending attorney at a deposition) may be presented with a prompt recommending an object to be made based upon a question being asked by another user (such as a deposing attorney). The prompt may recommend a certain objection be entered into the record, and may provide a basis for the objection. The prompt may be determined based upon an analysis of the question as recorded by a speech-to-text algorithm, by a human stenographer, a transcript, or other source. As a second example, a user may be presented with recommended follow-up questions. The recommended question may be based in part on one or more prior answers, on information in one or more documents, on a list of questions or notes prepared before the active event (such as illustrated at left in FIG. 4D). As a third example, a user may be presented with a prompt indicative of a conflicting answer being given. The system may know an expected answer to an asked question based upon information in one or more documents. The system may then identify when an answer is given that is contrary to an expected answer. The system may also provide a basis (such as a section of a specific document) in which the original answer was given and present that to the user, such that the user may impeach the witness or other participant. As a fourth example, a user may be presented with a prompt indicative of an ethical issue, a potential appeal issue, or other issue that the user may raise or avoid during the active event.

In embodiments of the present disclosure, the system may also decide or provide a recommendation regarding a disagreement between two or more users. The recommendation may analyze past decisions, rules, and other evidence to determine a likely resolution to the disagreement. For example, during a deposition, a disagreement may arise over the permissibility of a certain question. A first attorney may instruct a client not to answer the question while a second attorney insists on an answer. The system may analyze the disagreement and provide a recommendation as to which attorney is likely correct, along with one or more supporting reasons (such as a rule citation). This may serve as an independent suggestion to resolve the dispute, without the attorneys having to involve an outside decision maker (such as a judge or mediator).

Embodiments of the present disclosure may track success rates, usage rates, types of active events, and other statistics related to a user for a specific user account. The user (such as an attorney, moderator, arbitrator, expert witness, etc.) may thus advertise or find more work based at least in part on these tracked statistics. The user may share other information, such as a calendar of availability, notes, statements of specialty or interest areas, and the like. The user may further utilize the user account to receive and make payments related to the services rendered and received, respectively.

Example Content Streaming System

Figure 5:
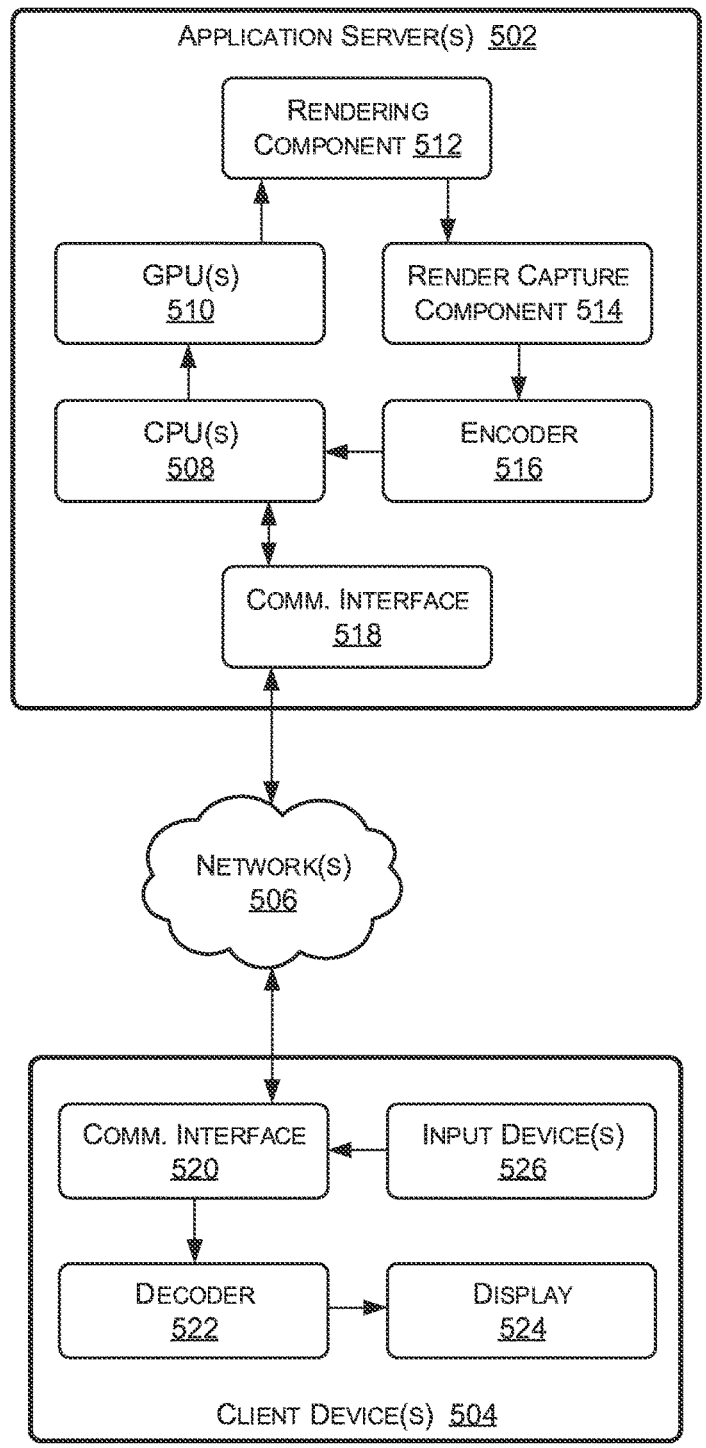
FIG. 5 is a block diagram of an example content streaming system suitable for use in implementing some embodiments of the present disclosure.

Now referring to FIG. 5, FIG. 5 is an example system diagram for a content streaming system 500, in accordance with some embodiments of the present disclosure. FIG. 5 includes application server(s) 502 (which may include similar components, features, and/or functionality to the example computing device 600 of FIG. 6), client device(s) 504 (which may include similar components, features, and/or functionality to the example computing device 600 of FIG. 6), and network(s) 506 (which may be similar to the network(s) described herein). In some embodiments of the present disclosure, the system 500 may be implemented. The application session may correspond to a game streaming application, a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 500, for an application session, the client device(s) 504 may only receive input data in response to inputs to the input device(s), transmit the input data to the application server(s) 502, receive encoded display data from the application server(s) 502, and display the display data on the display 524. As such, the more computationally intense computing and processing is offloaded to the application server(s) 502 (e.g., rendering—in particular ray or path tracing—for graphical output of the application session is executed by the GPU(s) of the game server(s) 502). In other words, the application session is streamed to the client device(s) 504 from the application server(s) 502, thereby reducing the requirements of the client device(s) 504 for graphics processing and rendering.

For example, with respect to an instantiation of an application session, a client device 504 may be displaying a frame of the application session on the display 524 based on receiving the display data from the application server(s) 502. The client device 504 may receive an input to one of the input device(s) and generate input data in response. The client device 504 may transmit the input data to the application server(s) 502 via the communication interface 520 and over the network(s) 506 (e.g., the Internet), and the application server(s) 502 may receive the input data via the communication interface 518. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 512 may render the application session (e.g., representative of the result of the input data) and the render capture component 514 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 502. In some embodiments, one or more virtual machines (VMs)— e.g., including one or more virtual components, such as vGPUs, vCPUs, etc.—may be used by the application server(s) 502 to support the application sessions. The encoder 516 may then encode the display data to generate encoded display data and the encoded display data may be transmitted to the client device 504 over the network(s) 506 via the communication interface 518. The client device 504 may receive the encoded display data via the communication interface 520 and the decoder 522 may decode the encoded display data to generate the display data. The client device 504 may then display the display data via the display 524.

Example Computing Device

Figure 6:
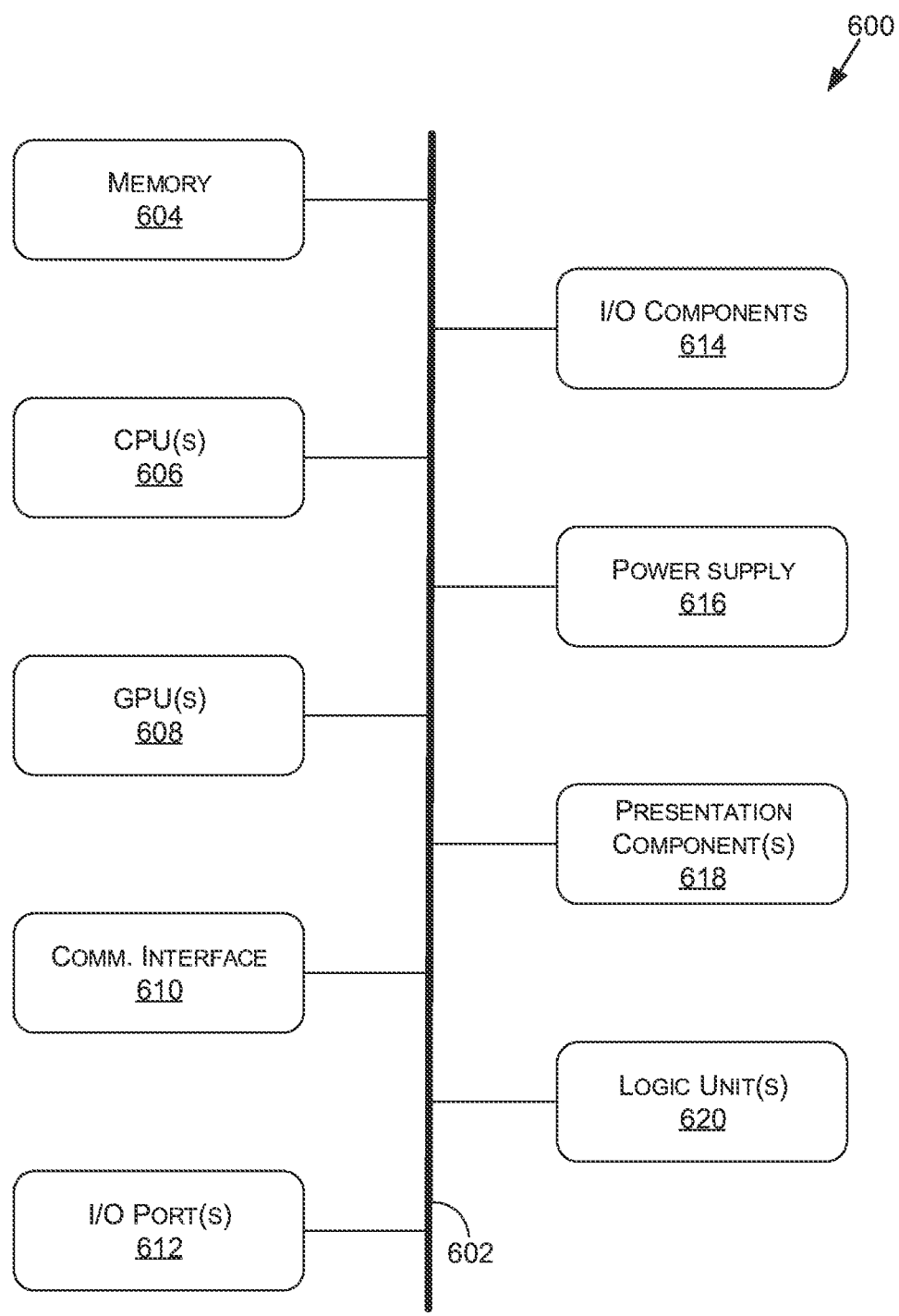
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

Example Data Center

Figure 7:
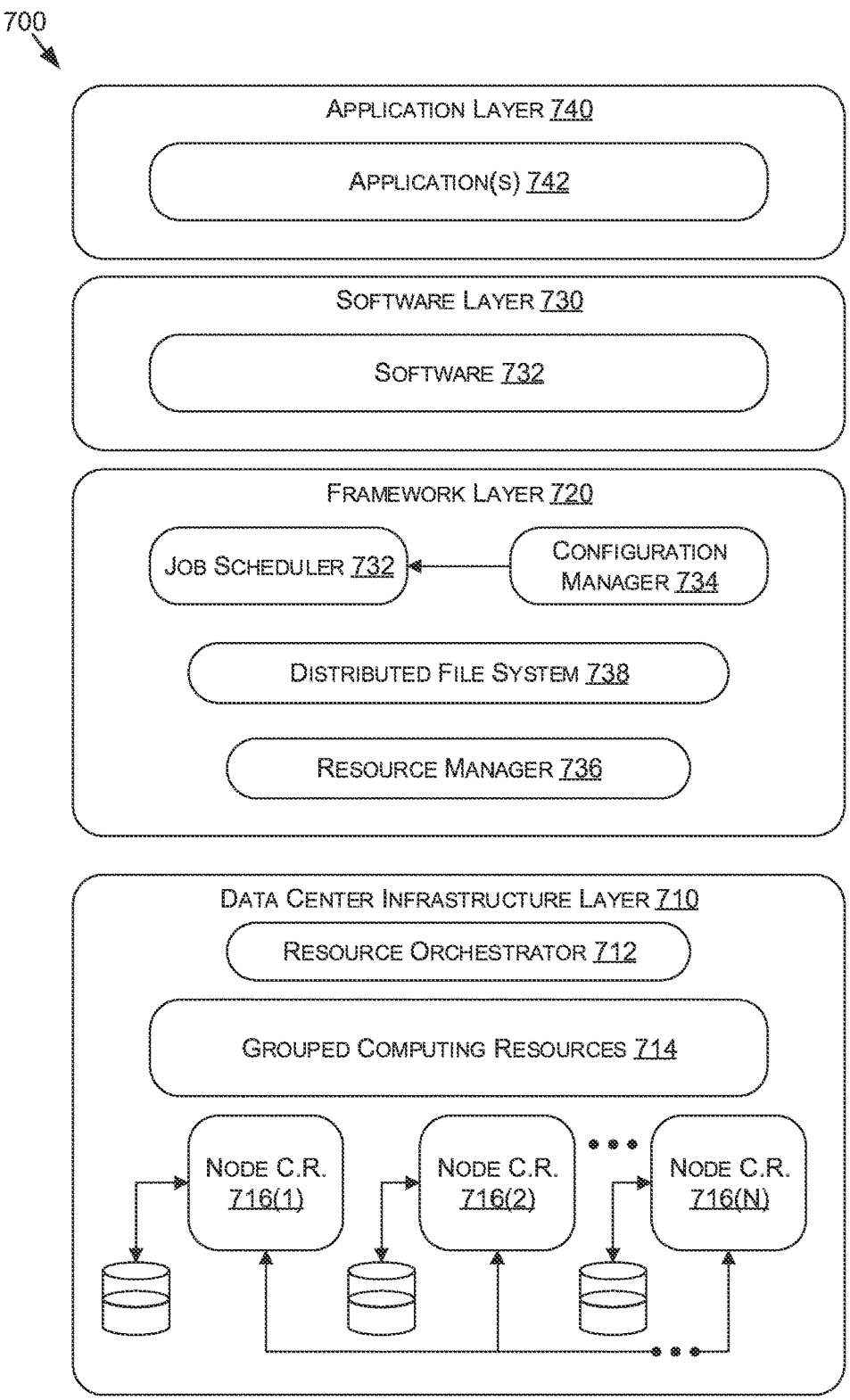
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, and/or other processors may be grouped within one or more racks to provide compute resources to support one or more workloads. The one or more racks may also include any number of power modules, cooling modules, and/or network switches, in any combination.

The resource orchestrator 722 may configure or otherwise control one or more node C.R.s 716(1)-716(N) and/or grouped computing resources 714. In at least one embodiment, resource orchestrator 722 may include a software design infrastructure (SDI) management entity for the data center 700. The resource orchestrator 722 may include hardware, software, or some combination thereof.

In at least one embodiment, as shown in FIG. 7, framework layer 720 may include a job scheduler 732, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 732 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 732. In at least one embodiment, clustered or grouped computing resources may include grouped computing resource 714 at data center infrastructure layer 710. The resource manager 1036 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computerized method comprising:
   acquiring an electronic document;
   saving the electronic document;
   receiving an active event indication;
   instructing the electronic document to be displayed on one or more displays during an active event corresponding to a legal proceeding including a court hearing, a deposition, an arbitration, a mediation, or a trial;
   receiving an active layer for the electronic document, the active layer configured for assisting in the access or display of particular information within the active layer during the active event corresponding to the legal proceeding;
   instructing the active layer to be displayed on the electronic document during the active event corresponding to the legal proceeding;
   providing a prompt indicative of a conflicting answer based on:
      receiving the conflicting answer to a question during the active event corresponding to the legal proceeding; and
      one or more electronic documents corresponding to a legal complaint and one or more outside legal resources including one or more of case law and a transcript from a similar legal complaint stored at a remote storage; and
   saving the active layer with the electronic document.

2. The computerized method of claim 1, wherein the step of saving the electronic document includes encrypting the electronic document.

3. The computerized method of claim 1, wherein the step of saving the electronic document includes certifying the electronic document from a source.

4. The computerized method of claim 1, wherein the active layer includes a highlighting of a text portion of the electronic document.

5. The computerized method of claim 1, further comprising:
   instructing a video conference feed to be displayed with the electronic document during the active event.

6. The computerized method of claim 1, wherein the active layer is displayed to at least one participant of a video conference.

7. A computerized method comprising:
   receiving a user copy of an electronic document for a legal proceeding including a court hearing, a deposition, an arbitration, a mediation, or a trial;
   displaying the user copy on a display;
   receiving, via an input, a customization of the electronic document;
   displaying a video conference for the legal proceeding along with the electronic document;
   displaying the customization on the electronic document;
   providing a prompt indicative of a conflicting answer based on:
      receiving the conflicting answer from one or more participants during the video conference; and
      one or more electronic documents corresponding to a legal complaint and one or more outside legal resources including one or more of case law and a transcript from a similar legal complaint stored at a server;
   sending the customization to the server such that the server may distribute the customization to the one or more participants of the video conference; and
   storing a local copy of the electronic document and the customization.

8. The computerized method of claim 7, wherein the customization includes a highlighting of a text portion of the electronic document.

9. The computerized method of claim 7, wherein the customization is a pre-active layer created before the displaying of the video conference.

10. The computerized method of claim 7, wherein the customization is an active layer created during the displaying of the video conference.

11. The computerized method of claim 7, wherein the conflicting answer from the one or more participants is a spoken answer.

12. A system comprising:
   a server including a non-transitory computer readable storage medium having a computer program stored thereon which, when executed by a server processor, instructs the server processor to perform the following steps:
      acquiring an electronic document corresponding to a legal proceeding including a court hearing, a deposition, an arbitration, a mediation, or a trial;
      saving the electronic document;
      receiving an active event indication;
      instructing the electronic document to be displayed on one or more displays during an active event corresponding to the legal proceeding;

receiving an active layer for the electronic document, the active layer configured for assisting in the access or display of particular information within the active layer during the active event;
instructing the active layer to be displayed on the electronic document during the active event;
saving the active layer with the electronic document; and
a user device including a non-transitory computer readable storage medium having a computer program stored thereon which, when executed by a user device processor, instruct the user device processor to perform the following steps:
receiving a user copy of the electronic document;
displaying the user copy on a display;
receiving, via an input, a customization of the electronic document;
displaying a video conference along with the electronic document;
displaying the customization on the electronic document;
based on displaying the video conference along with the electronic document, providing prompt indicative of a conflicting answer based on receiving the conflicting answer from one or more participants during the video conference and based on one or more electronic documents corresponding to a legal complaint and one or more outside legal resources including one or more of case law and a transcript from a similar legal complaint stored at the server;
sending the customization to the server such that the server may distribute the customization to the one or more participants; and
storing a local copy of the electronic document and the customization.

13. The system of claim 12, wherein the step of saving the electronic document includes encrypting the electronic document.

14. The system of claim 12, wherein the step of saving the electronic document includes certifying the electronic document from a source.

15. The system of claim 12, wherein the active layer includes a highlighting of a text portion of the electronic document.

16. The system of claim 12, wherein the customization is a pre-active layer created before the displaying of the video conference.

17. The system of claim 12, wherein the customization is an active layer created during the displaying of the video conference.

* * * * *